June 18, 1940.   L. DOTTA   2,204,846
ARTICHOKE TRIMMING MACHINE
Filed May 22, 1937   3 Sheets-Sheet 1

INVENTOR,
Louis Dotta
BY Booth & Booth
ATTORNEYS.

June 18, 1940. L. DOTTA 2,204,846
ARTICHOKE TRIMMING MACHINE
Filed May 22, 1937 3 Sheets-Sheet 2

INVENTOR.
Louis Dotta
BY Booth & Booth
ATTORNEYS.

June 18, 1940.  L. DOTTA  2,204,846

ARTICHOKE TRIMMING MACHINE

Filed May 22, 1937  3 Sheets-Sheet 3

INVENTOR,
Louis Dotta
BY Booth & Booth
ATTORNEYS.

Patented June 18, 1940

2,204,846

UNITED STATES PATENT OFFICE 2,204,846

ARTICHOKE TRIMMING MACHINE

Louis Dotta, San Jose, Calif., assignor to Pratt-Low Preserving Company, Santa Clara, Calif., a corporation of California Application May 22, 1937, Serial No. 144,280

3 Claims. (Cl. 146—81)

The present invention relates to apparatus for trimming and cutting an artichoke in such a manner as to prepare therefrom a small edible portion, which can be preserved by canning.

The principal object of the invention is to provide a machine which will form, from a whole artichoke, a flat wafer or disk of the edible heart portion of the artichoke, without including therewith any of the woody or fibrous portions of the vegetable. A second object is to provide a machine which is easy to feed by hand, and which automatically carries out its functions without further attention on the part of the operator. Still other objects and advantages of the invention will be brought out in the following specification, which should be read with the understanding that the form, construction and arrangement of the several parts herein shown and described may be varied, within the limits of the claims hereto appended, without departing from the spirit of the invention as defined in said claims.

A preferred form of the invention is illustrated in the accompanying drawings, wherein.

Figure 4:
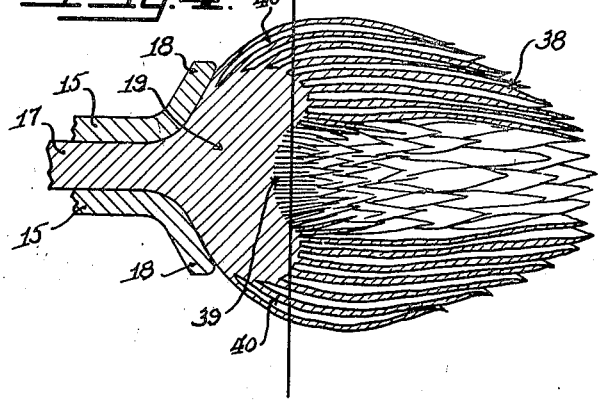
Fig. 4 is a longitudinal central section of an artichoke illustrating the first cutting operation.

Referring more particularly to the drawings, a rotatable turret 11 is mounted upon a horizontal shaft 12 in a frame 13, and carries a plurality of chucks 14, there being four such chucks in the machine herein illustrated. Each chuck has a plurality of jaws 15, Fig. 2, opened and closed by the movement of an arm 16, and formed to grasp the stem 17 of an artichoke as shown in Fig. 4. The outer ends of said jaws are flared outwardly, as shown at 18, to support and partially grasp the butt 19 of the artichoke.

Figure 1:
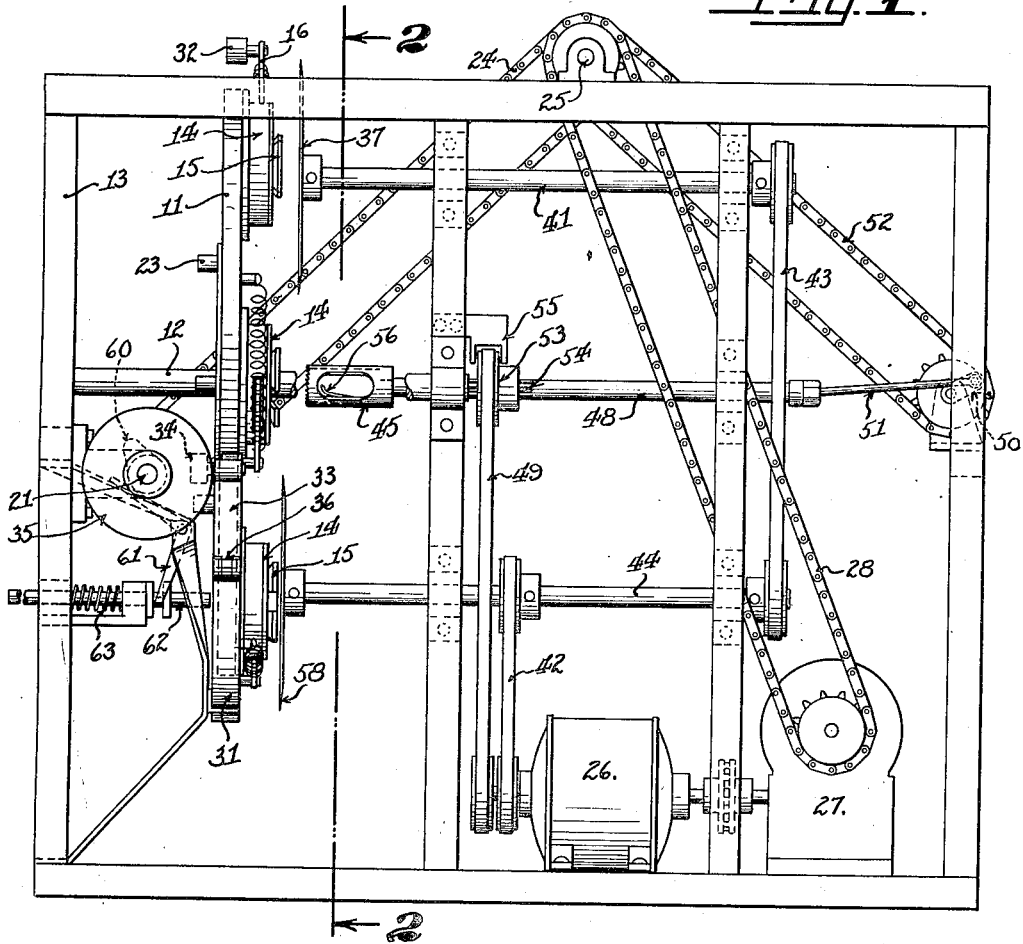
Fig. 1 is a side elevation of the complete machine.
Figure 3:
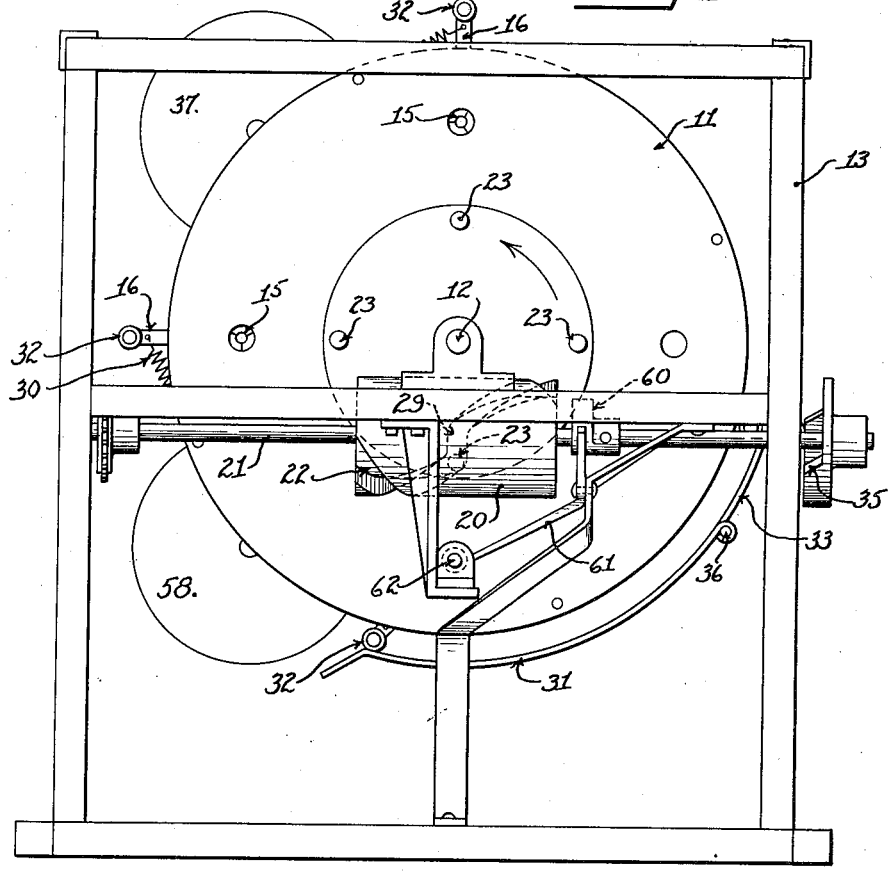
Fig. 3 is an end elevation, viewed from the left of Fig. 1.

The turret 11 is step-rotated by any suitable driving mechanism, such as a cam member 20, Fig. 3, mounted on a transverse shaft 21 and formed with a helical groove 22 which engages pins 23 projecting from the rear face of the turret. The shaft 21 is continuously rotated by a chain 24, Fig. 1, from a countershaft 25 at the top of the frame, said countershaft being driven by a motor 26 through a reduction gear 27 and a chain 28. As the cam 20 revolves, its helical groove 22 successively picks up the pins 23 and turns the turret 11 one quarter revolution. At one point in its length, the groove 22 has a straight portion 29, Fig. 3, which causes the turret to have periods of rest between each quarter revolution of movement.

Figure 2:
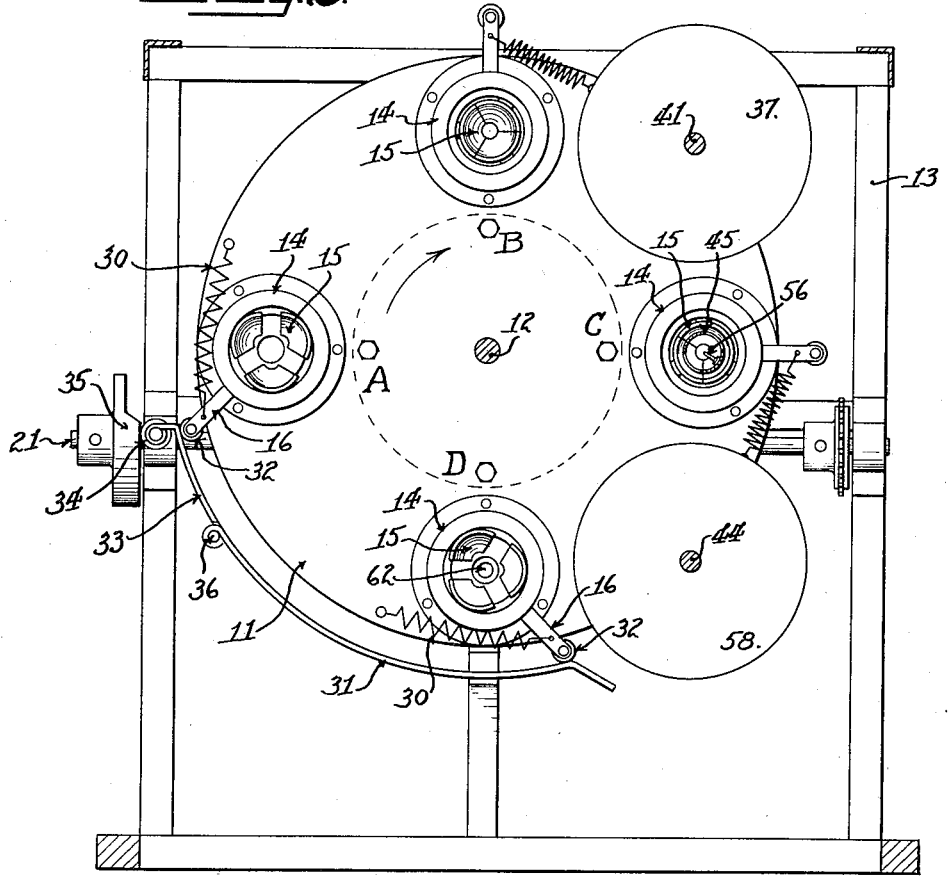
Fig. 2 is a transverse section taken on the line 2—2 of Fig. 1.

The chucks 14 are normally held closed by springs 30, Fig. 2, attached to their arms 16, and are opened, during one quarter revolution of the turret, by a track 31 by which said arms are moved to open the jaws 15 of the chucks. The arms 16 are preferably provided with rollers 32 which ride upon said track. The major portion of the track 31 is stationary, but at its upper end it has a hinged section 33 which can swing outwardly to allow the chuck to close before its arm runs off the track. This hinged track section is provided with a roller 34 which bears against a cam 35 mounted on the shaft 21, said cam moving the track section 33 in and out about its hinge 36.

When the turret first comes to rest, the chuck at the position A, Fig. 2, is open as shown, to permit the operator to insert an artichoke. Then, before the turret begins to move, the cam 35 allows the track section 33 to swing out, thereby closing the chuck and causing it to grip the artichoke. By this means, the artichoke is gripped by the chuck before the turret begins to move, so that the operator is not required to hold the artichoke in a moving chuck.

The step rotation of the turret carries the chuck successively to the positions B, C, and D. Between positions B and C, the artichoke held by the chuck is carried past a rapidly rotating knife 37, which cuts through it transversely in a plane indicated by the line 37a in Fig. 4. This operation cuts off most of the leafy and fibrous portions 38 of the artichoke, but a portion of the so-called choke remains in the hollow of the butt, as indicated at 39, and the bases of some of the outer leaves, as shown at 40, also remain attached to the butt. The knife 37 is mounted upon a shaft 41, Fig. 1, and is driven continuously at high speed by the motor 26 through belts 42 and 43 and a countershaft 44.

Figure 5:
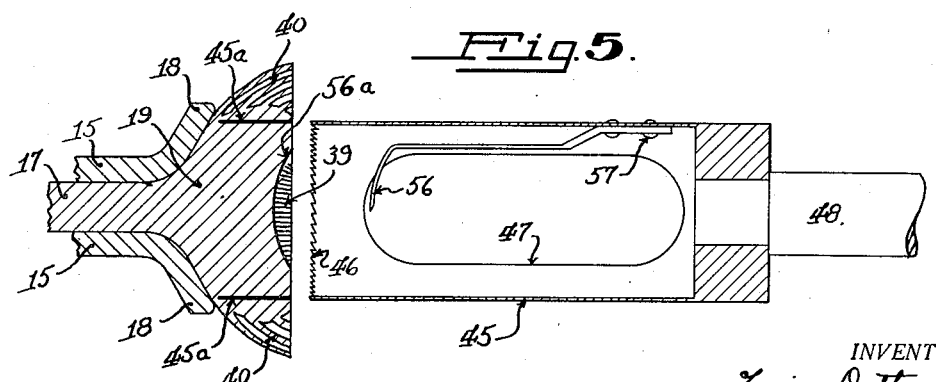
Fig. 5 is a longitudinal section of the butt of the artichoke and the trimming knife, illustrating the trimming operation which follows the cut shown in Fig. 4.

When the artichoke reaches the position C it has the form shown in Fig. 5, and while the turret rests in this position, a rotating tubular trimming knife 45 is advanced into the butt of the artichoke, the diameter of said trimming knife being such that it trims off all the remaining base portions of the leaves and cuts slightly into the solid portion of the butt, as indicated by the lines 45a. The trimming knife 45 is formed as a cylinder with a cutting end 46, preferably serrated, and with its sides cut out as shown at 47, to reduce its weight. It is mounted upon a shaft 48, Fig. 1, which is rotated at high speed by a belt 49 from the motor 26. The shaft 48 is shifted lengthwise, to move the trimming knife into the artichoke, by a crank 50 and connecting link 51, said crank being driven by a chain 52 from the countershaft 25. The pulley 53 over which the belt 49 runs is slidably splined upon the shaft 48, as shown at 54, and is prevented from following the endwise movement of said shaft by a guide 55.

A narrow curved blade 56, Fig. 5, is mounted inside the trimming knife 45, and secured to it as shown at 57. This blade has its end portion sharpened along one edge and is formed to scoop out the remaining choke portion 39 of the artichoke as indicated by the line 56a. Thus the trimming knife, at one operation, removes all the remaining fibrous and leafy portions 39 and 40 from the butt of the artichoke.

Figure 6:
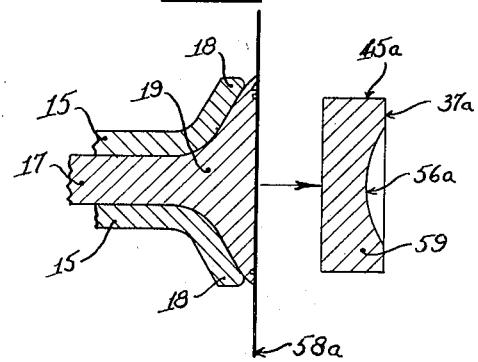
Fig. 6 is a longitudinal section of the butt of the artichoke, illustrating the final cutting operation and the finished product formed thereby.

The next movement of the turret carries the trimmed artichoke, still held in the chuck, to the position D. During this movement from C to D, the artichoke is carried across a second rotary knife 58, Fig. 2, mounted on the high speed shaft 44, which makes a second transverse cut close to the jaws of the chuck, as indicated by the line 58a in Fig. 6. This cut severs a disk or wafer 59 of the solid heart portion of the artichoke, which falls to any suitable receptacle or conveyer, not shown, and is recovered therefrom. The disk or wafer 59 is the final product of the machine, and is the only portion of the artichoke that is used, the remainder being discarded as waste. When preserved by canning, the disks or wafers 59 have a ready market as delicacies.

Shortly before the chuck reaches the position D, Fig. 2, its jaws are opened by the roller 32 riding upon the track 31. Then while said chuck is at rest at position D, a cam 60 on the shaft 21, Figs. 1 and 3, operates a lever 61, which in turn slides an ejector rod 62 through the open chuck and pushes out the stem 17 and the remaining waste portion 19 of the butt of the artichoke. A spring 63, Fig. 1, retracts the ejector 62 before the turret begins to move.

The next and last movement of the turret carries the open chuck from the position D to the position A, where the operator inserts another artichoke, and the cycle begins again.

It will be seen from the foregoing that the operation of the machine is continuous, and automatic except for the feeding of the artichokes into the chucks. It will also be seen that the manual feeding operation is simplified by the action of the cam 35 in closing the chuck upon the artichoke before the turret begins to move said chuck away from the feeding position.

I claim:

1. An artichoke trimming machine comprising a turret, a chuck carried by said turret for holding an artichoke, said chuck having a plurality of relatively movable jaws, each jaw having a semi-cylindrical portion formed to grasp the stem of the artichoke and an outwardly flared end portion formed to support the butt thereof, means for trimming said artichoke, means for intermittently rotating said turret to carry the artichoke to and from said trimming means, means operated by the rotary movement of said turret for opening said chuck to permit the discharge of said artichoke, and means for closing said chuck while the turret is at rest.

2. An artichoke trimming machine comprising a turret, a chuck carried by said turret for holding an artichoke, means for trimming said artichoke, means for intermittently rotating said turret to carry the artichoke to and from said trimming means, means normally urging the chuck into closed position, a movable member carried by said chuck for opening and closing the same, a track positioned to engage said member during a portion of the movement of said turret, said engagement moving said member to open said chuck, and means for disengaging said track and said member during a rest period of the turret to cause said member to close said chuck.

3. An artichoke trimming machine comprising a turret, a chuck carried by said turret for holding an artichoke, means for trimming said artichoke, means for intermittently rotating said turret to carry the artichoke to and from said trimming means, means normally urging the chuck into closed position, a movable member carried by said chuck for opening and closing the same, a track positioned to engage said member during a portion of the movement of said turret, said engagement moving said member to open said chuck, and means for moving a portion of said track out of engagement with said member during a rest period of the turret to cause said member to close said chuck.

LOUIS DOTTA.